(12) United States Patent
Grampassi

(10) Patent No.: US 10,638,774 B2
(45) Date of Patent: May 5, 2020

(54) METHOD FOR PREPARING REFRIGERATED PRODUCTS

(71) Applicant: S.P.M. DRINK SYSTEMS S.P.A., Spilamberto (IT)

(72) Inventor: Enrico Grampassi, Spilamberto (IT)

(73) Assignee: S.P.M. DRINK SYSTEMS S.P.A., Spilamberto (MO) (IT)

( * ) Notice: Subject to any disclaimer, the term of this patent is extended or adjusted under 35 U.S.C. 154(b) by 59 days.

(21) Appl. No.: 15/750,305

(22) PCT Filed: Aug. 4, 2016

(86) PCT No.: PCT/IB2016/054714
§ 371 (c)(1),
(2) Date: Feb. 5, 2018

(87) PCT Pub. No.: WO2017/021925
PCT Pub. Date: Feb. 9, 2017

(65) Prior Publication Data
US 2018/0220673 A1    Aug. 9, 2018

(30) Foreign Application Priority Data

Aug. 6, 2015   (IT) .................. 102015000043059

(51) Int. Cl.
*A23G 9/12*      (2006.01)
*A23G 9/08*      (2006.01)
(Continued)

(52) U.S. Cl.
CPC ............... *A23G 9/12* (2013.01); *A23G 9/045* (2013.01); *A23G 9/08* (2013.01); *A23G 9/224* (2013.01);
(Continued)

(58) Field of Classification Search
CPC .......... A23G 9/12; A23G 9/224; A23G 9/045; A23G 9/228; A23G 9/283; A23G 9/26; B01F 15/066; B01F 13/1022; B01F 7/08; B01F 7/00433; B01F 15/00201; B01F 2015/061; A32G 9/08
See application file for complete search history.

(56) References Cited

U.S. PATENT DOCUMENTS 4,878,760 A        11/1989  Newton et al.
5,158,506 A  *     10/1992  Kusano ................. A23G 9/163
                                                        62/136
(Continued)

FOREIGN PATENT DOCUMENTS

JP     2002 176926 A      6/2002
WO     03/082022 A1      10/2003
WO     2014091393 A1      6/2014

*Primary Examiner* — Emmanuel E Duke
(74) *Attorney, Agent, or Firm* — McGlew and Tuttle, P.C.

(57) ABSTRACT

The method for preparing refrigerated products provides to control the solidity of a product being prepared inside a containment tank (2) of said product, until reaching a predetermined solidity, and to measure the temperature of the same product inside said tank (2) once reached said predetermined solidity. Once reached the predetermined solidity, said temperature of the product is set as reference temperature and said reference temperature is kept constant during the subsequent functioning.

13 Claims, 2 Drawing Sheets

(51) Int. Cl.
*B01F 13/10* (2006.01)
*B01F 15/00* (2006.01)
*B01F 7/00* (2006.01)
*B01F 15/06* (2006.01)
*B01F 7/08* (2006.01)
*A23G 9/04* (2006.01)
*A23G 9/22* (2006.01)

(52) U.S. Cl.
CPC ............ *B01F 7/00433* (2013.01); *B01F 7/08* (2013.01); *B01F 13/1022* (2013.01); *B01F 15/00175* (2013.01); *B01F 15/00201* (2013.01); *B01F 15/066* (2013.01); *B01F 2015/061* (2013.01)

(56) References Cited

U.S. PATENT DOCUMENTS

| | | | | |
|---|---|---|---|---|
| 6,705,106 B1* | 3/2004 | Cunha | ............... | A23G 9/045 222/146.6 |
| 7,152,765 B1* | 12/2006 | Midden | ............ | A23G 9/045 222/511 |
| 2004/0226305 A1* | 11/2004 | Grampassi | ............ | A23G 9/045 62/135 |
| 2013/0152620 A1* | 6/2013 | Ugolini | ............... | A23G 9/12 62/426 |

* cited by examiner

METHOD FOR PREPARING REFRIGERATED PRODUCTS

TECHNICAL FIELD

The present invention concerns a method and an apparatus for preparing refrigerated products, such as for example slushes, creamy ice-creams, sorbets and the like.

BACKGROUND ART

It has been known the use of apparatuses for preparing and instantly dispensing refrigerated products of the type of traditional water based slushes or alternatively creamy products such as ice-creams, sorbets, coffee creams and the like.

These known apparatuses are generally made up of a tank predisposed to contain the product to be prepared and dispensed, in which there are a cooling device for cooling the product to a suitable temperature and a mixing device for determining the continuous circulation of the product inside the tank. The mixing device, constituted for example by a screw member brought in rotation according to the longitudinal axis of the tank, is predisposed to convey the cooled product towards a front zone, in which a product dispensing device is placed. The dispensing device is provided with a shutter element which can be operated by an external lever member.

The cooling device is often made up of an evaporator coil arranged inside a tubular body, substantially cylindrical, arranged according to the horizontal axis of the tank. The evaporator is connected to a refrigeration system housed inside a base body on which the containment tank is mounted. The screw member of the mixing device is wound on the tubular body of the evaporator.

An apparatus for dispensing refrigerated products of this kind is disclosed for example in WO 03/082022.

A problem in the use of the above mentioned apparatuses is the need of controlling that the characteristics of the dispensed product remain constant, in particular with reference to solidity and temperature of the product.

In fact, when the level of the product inside the tank lowers, the refrigeration system tends to work longer, making the product too icy.

Moreover, a variation in the kind of product being prepared and/or of its characteristics, for example, a variation in the sugar content of the product (so called Degrees Brix) gives rise to problems in the correct managing of the apparatus and can cause preparation mistakes by the user.

The known solutions do not satisfyingly solve such exigency.

DISCLOSURE

The task of the present invention is that of solving the aforementioned problems, devising a method for preparing refrigerated products which allows to keep constant the characteristics of the product being dispensed.

Another scope of the invention is to provide an apparatus which allows to implement the above mentioned method through a structure of simple constructive and functional conception, provided with surely reliable functioning, of versatile use, as well as of relatively economic cost.

The cited scopes are reached, according to the present invention, by the method for preparing refrigerated products according to claim 1.

According to the present invention, the method for preparing refrigerated product provides to control the solidity of the product being prepared inside a containment tank until reaching a predetermined solidity; measuring the temperature of said product inside said tank once said predetermined solidity has been reached; setting said temperature of the product once reached said predetermined solidity as reference temperature; controlling the temperature of said product inside said tank to keep constant said reference temperature during the subsequent functioning of the apparatus.

The method according to the invention is preferably implemented by an apparatus comprising at least one containment tank predisposed to contain the product to be prepared; a mixing device arranged inside said tank and predisposed to determine the continuous circulation of the product inside the same tank, to convey the product towards a front zone of said tank; a cooling device arranged inside said tank to cool said product; a product dispensing device, placed at said front zone of the containment tank.

Preferably, the method provides to control said solidity of the product being prepared through the resisting torque met by a screw element of said mixing device brought in rotation inside said tank.

Preferably, the method provides to control said temperature of the product being prepared through a temperature sensor associated with said cooling device, close to said front zone of the containment tank.

Preferably, said temperature sensor protrudes frontally from a cylindrical body of said cooling device inside which an evaporator coil is housed and connected to a refrigeration system.

Preferably, the method provides stabilizing said solidity of the product to the reference temperature by a series of cycles of switching on and off of said cooling device.

Preferably, the method further provides, in case of change of the temperature inside said tank beyond a predetermined limit, to automatically repeat a cycle comprising a preparation step, to bring said product to said predetermined solidity; a step of stabilization of said predetermined solidity followed by the measurement of said reference temperature; and a maintenance step of said reference temperature by means of the constant control of the product temperature.

The present invention also concerns an apparatus for preparing refrigerated products comprising temperature control means and solidity control means of the product being prepared inside a containment tank.

The apparatus comprises a mixing device arranged inside said tank and predisposed to determine the continuous circulation of the product inside the same tank, to convey the product towards a front zone of said tank; a cooling device placed inside said tank to cool said product; a gear motor member predisposed to operate in rotation said mixing device according to an axis substantially longitudinal to said containment tank; a product dispensing device, placed at said front zone of the containment tank.

Advantageously, said gear motor member is tilting according to said axis substantially longitudinal to said containment tank.

Preferably, said solidity control means of the product being prepared inside said tank comprise an adjustable resilient member, acting so as to contrast the resisting torque which opposes the rotation of a rotating member of said mixing device.

Preferably, said rotating member comprises a screw member brought in rotation according to an axis longitudinal to the containment tank.

Preferably, said screw member is brought in rotation by a shaft arranged according to an axis substantially longitudinal to said tank and associated with said gear motor member.

Preferably, said resilient member is associated with the casing of said gear motor member.

Preferably, said gear motor member is predisposed to operate, upon an angular rotation of the same gear motor member, a microswitch intended to command control means of said cooling device.

Preferably, said temperature control means comprise a temperature sensor associated with said cooling device, at said front zone of the containment tank.

DESCRIPTION OF DRAWINGS

Details of the invention shall be more apparent from the detailed description of a preferred embodiment of the apparatus for preparing refrigerated products, illustrated for indicative purposes in the attached drawings, wherein.

BEST MODE

Figure 1:
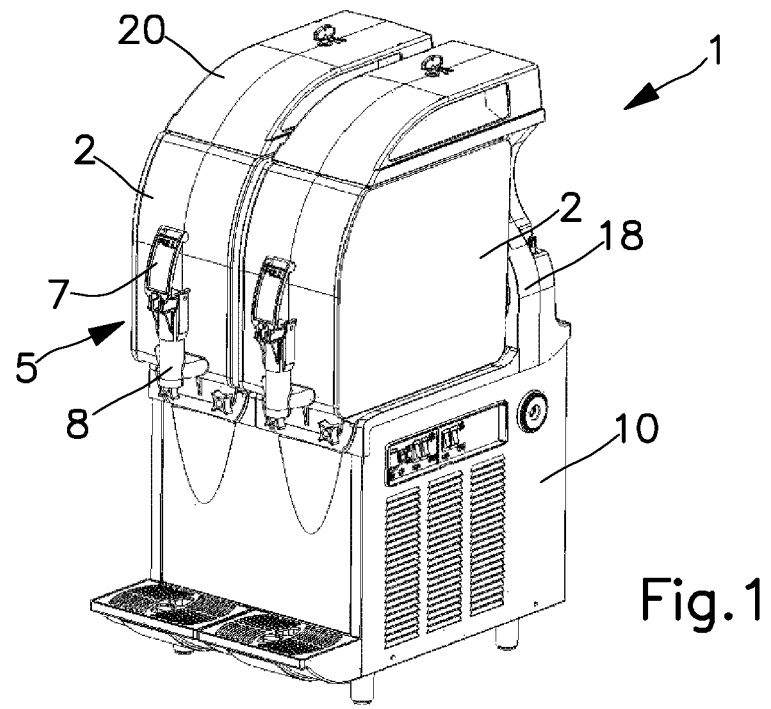
FIG. 1 shows a perspective view of the apparatus according to the invention.
Figure 2:
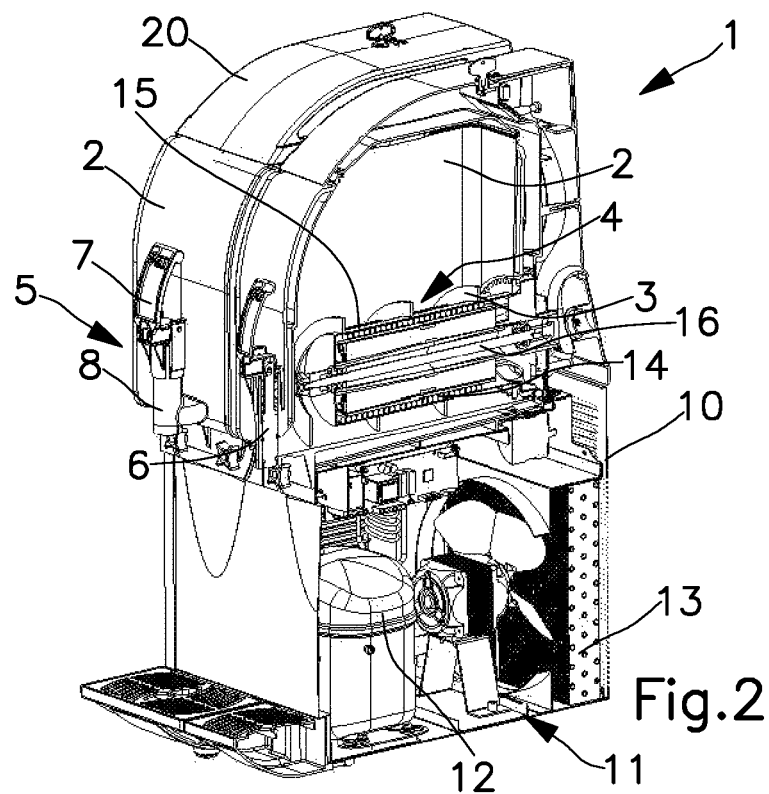
FIG. 2 shows the same perspective view of the apparatus in cross-section according to a longitudinal plane for showing the inner members.
Figure 3:
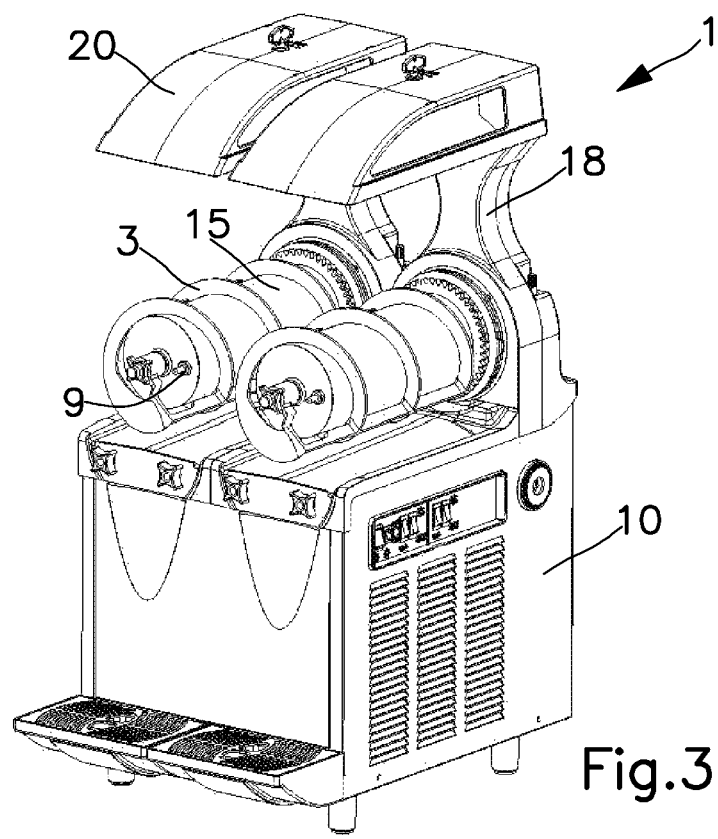
FIG. 3 shows the same perspective view of the apparatus with removed parts for showing inner members.
Figure 4:
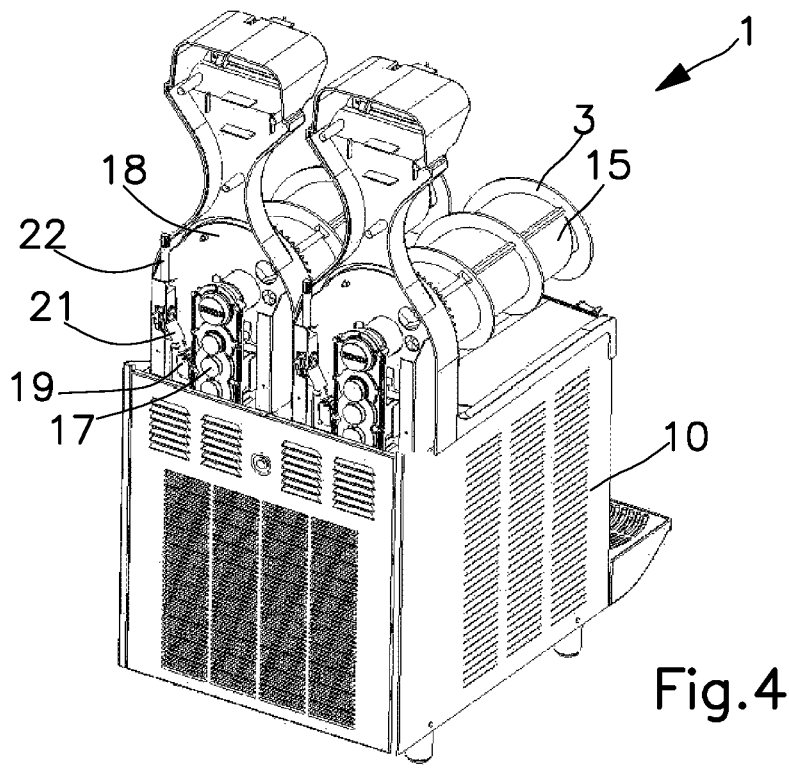
FIG. 4 shows a perspective view of the apparatus from a rear side, with removed parts to show inner members.

With particular reference to such figures, the apparatus for preparing and dispensing refrigerated products, such as for example slushes, creamy ice-creams, sorbets and the like is indicated in its entirety with 1.

The apparatus 1 comprises at least one containment tank 2 of the product to be dispensed, preferably made of plastic transparent material. In the illustrated case, the apparatus comprises two tanks 2 for containing the product, arranged side by side to one another for preparing and dispensing different products, but it is obviously possible to provide a different number of these tanks 2, in particular one single tank. The tanks 2 are open at the top and provided with a respective lid 20.

The two tanks 2 are mounted on a single base body 10. The base body 10 has substantially prismatic shape and is predisposed to contain internally the operation means of the apparatus, known per se. In particular, inside the base body 10, a refrigeration system 11 is housed which comprises, in substantially known manner, a compressor 12 and a condenser 13.

Inside each containment tank 2 there is a mixing device 3 constituted by a screw member, brought in rotation according to an axis longitudinal to the tank 2 to determine the continuous rotation of the product inside the same tank 2. The blades of the screw member 3 are predisposed to keep the product mixed and to push it towards the front zone of the tank 2, where there is the dispensing zone.

Moreover, inside the tank 2, a cooling device 4 is also placed to cool the product up to the suitable temperature. The cooling device 4 is preferably constituted by an evaporator coil 14 arranged inside a tubular body 15, substantially cylindrical. The cylindrical body 15 is mounted with horizontal axis, according to the above mentioned rotation axis of the screw member.

The containment tank 2 frontally has a dispenser device 5 in communication with the lower portion of the same tank 2. The dispenser device 5 is provided with a shutter member 6 which can be operated through an external lever member 7. The shutter member 6 is slidable inside a cylindrical seat obtained, with substantially vertical axis, from a sleeve 8 shaped by the tank 2. More precisely, the shutter 6 is mobile, in known manner, through the contrast of elastic means, between a closure position and an opening position of the opening of the sleeve 8.

Inside the containment tank 2 is also arranged a temperature sensor 9, predisposed to check the temperature of the product at the dispensing zone. The temperature sensor 9 preferably protrudes from the cylindrical body 15 of the cooling device 4, close to the front wall of the tank 2.

The screw member of the mixing device 3 extends on the external surface of the cylindrical body 15 and is brought in rotation by a shaft 16 which axially crosses the same cylindrical body 15. The shaft 16 protrudes for a portion from the front wall of the cylindrical body 15 and is fixed to a sleeve shaped by the screw member. The shaft 16 is predisposed to be operated by a motor member 17, preferably an electric motor, through a suitable reducer member. In practice, such motor member 17 is made up of a gear motor member. The casing of the gear motor member 17 is mounted tilting on a vertical plane, according to the rotation axis of the shaft 16. The gear motor member 17 is housed inside a shoulder 18 which raises from the rear part of the base body 10 and carries, embossed, the cylindrical body 15.

The angular rotation of the gear motor member 17 is suitable to operate, in a predefined position, a microswitch 19 housed at one side of the same gear motor member 17. The signal generated by the activation of the microswitch is sent to the electronic control board of the apparatus, in particular for the managing of the refrigeration system.

The gear motor member 17 is stressed by an elastic member 21, for example a helical spring, the compression of which can be adjusted through an adjustment screw 22.

The method for preparing and dispensing refrigerated products, such as slushes, creamy ice-creams, sorbets and the like, is described in the following.

After having introduced the product inside the tank 2, through the upper opening, the preparation cycle is started, in which the product is progressively frozen, passing from the liquid to the frozen typical state of the slush, for example. In particular, the cooling device 4 is operated and the screw member 3 of the mixing device is operated in rotation at a pre-established speed.

At this step, the solidity of the product being prepared inside said tank is controlled until reaching a predetermined solidity. Such solidity is defined by the setting of the elastic member 21. In fact, when the solidity of the product increases, in the freezing step, also the resisting torque which contrasts the rotation of the screw member 3 increases. As soon as such resisting torque exceeds the force exerted by the elastic member 21, an angular rotation of the gear motor member 17, carried tilting according to the rotation axis of the screw member 3, is produced. Such rotation determines the operation of the microswitch 19, which sends a signal to the control board of the refrigeration system.

Suitably, at this point, a series of switching on and switching off shorter cycles of the refrigeration system is started, in order to keep unchanged the reached solidity of the product, that is in order to stabilize the solidity of the product at the predetermined value.

At the end of this solidity stabilization step, the temperature of the product is measured inside the tank 2, through the temperature sensor 9 protruding frontally from the cylindrical body 15. Such temperature of the product, corresponding to the predetermined solidity to be reached, is set as reference temperature for the subsequent working of the apparatus. From this moment the functioning to speed of the apparatus starts, in which the product, brought to the correct solidity, is kept at this condition controlling its temperature. In particular, the temperature of the product is controlled in continuous manner so as to preserve the reference temperature.

In the case of an increase of the temperature inside the tank 2 occurs, above a prefixed limit, it means that the solidity of the product has changed with respect to the predetermined value. It typically happens when further product at the liquid state is added inside the tank. In such case, the previously described cycle is repeated, that is the following steps are realized: a preparation step to bring the product to the desired solidity, a stabilization step of such solidity followed by the measuring of the reference temperature and by a last maintenance step of constant control of the temperature of the product.

When it is required, the product can be obviously dispensed by operating in opening the dispenser device 5 through the lever member 7.

Therefore, the method and the apparatus according to the invention reach the scope of performing in an optimal manner the preparation of refrigerated products, such as slushes, creamy ice-creams, sorbets and the like, ensuring that the product preserves constant characteristics.

This result is obtained through the inventive idea of combining the measuring of the solidity of the product, in preparation step, and the measurement of the temperature of the product, in the maintenance step, upon reaching the predetermined solidity.

Controlling the product preparation through the measuring of its solidity offers the advantage of making the apparatus really flexible both with respect to the kind of product and its features, in particular with respect to the variations of its sugar content (so called Degrees BRIX)

Vice versa, controlling the finished product through the measurement of its temperature offers the advantage of keeping constant its temperature in time, which instead is not possible when controlling the solidity of the finished product. Moreover, the control of the finished product through the measurement of its temperature allows preventing the product to be too icy, in particular in case the level of the product inside the tank is low.

A feature of the invention is that the disclosed method is applied through measurements of temperatures and solidity of the product implemented in a very simple way.

The apparatus described as an example is susceptible of numerous modifications and variants according to the different exigencies.

In practice, the used materials as well as the size and shape may vary according to the needs.

Should the technical characteristics mentioned in the claims be followed by reference signs, such reference signs were included for the sole purpose of increasing the understanding of the claims and thus they shall not be deemed limiting the scope of the element identified by such reference signs by way of example.

The invention claimed is:

1. A method for preparing refrigerated products, in an apparatus comprising at least one containment tank predisposed to contain a product to be prepared, a mixing device arranged inside said tank and predisposed to determine a continuous circulation of said product inside said tank, for conveying said product towards a front zone of said tank, a motor member configured to operate in rotation said mixing device, an elastic member connected to the motor member, said elastic member applying an elastic member force to said motor member, a cooling device arranged inside said tank to cool said product, an electronic control board of the apparatus for managing said cooling device, and a dispensing device of said product, placed at said front zone of said containment tank, the refrigerated products comprising one or more of slushes, creamy ice-creams and sorbets, the method comprising the steps of:

in a preparation step, controlling a solidity of said product being prepared inside said tank such that said solidity of said product has a predetermined solidity, said solidity being controlled through a resisting torque met by a screw element of said mixing device brought in rotation inside said tank;

upon reaching said predetermined solidity, measuring a temperature of said product inside said tank, said predetermined solidity being reached when the resisting torque exceeds said elastic member force exerted by said elastic member;

setting said temperature of said product upon reaching said predetermined solidity as a reference temperature;

in a preserving step, controlling said temperature of said product inside said tank to preserve said reference temperature during subsequent working of said apparatus;

automatically repeating, in case of temperature variation inside said tank beyond a prefixed limit, a cycle comprising said preparation step to bring said product at said predetermined solidity, a stabilization step of said predetermined solidity followed by measuring said reference temperature and a preserving step of said reference temperature through a constant control of said temperature of said product.

2. The method according to claim 1, further comprising: stabilizing said solidity of said product at said reference temperature by means of a series of cycles of switching on and off of said cooling device.

3. The method according to claim 1, wherein the elastic member comprises a spring.

4. The method according to claim 1, wherein the elastic member comprises a spring.

5. The method according to claim 1, wherein the elastic member force is adjustable via a fastener.

6. A method for preparing refrigerated products, the method comprising:

providing an apparatus comprising at least one containment tank for containing a product to be prepared, a mixing device arranged inside said tank and said mixing device configured provide a continuous circulation of said product inside said tank, a cooling device arranged inside said tank to cool said product, an electronic control board for controlling said cooling device, a motor member configured to rotate said mixing device when said motor member is operated, an elastic member connected to the motor member, a microswitch and a dispensing device of said product connected to said containment tank, said elastic member applying an elastic member force to said motor member, said mixing device comprising a screw member, said motor member being connected to the screw member for rotating the screw member;

cooling said product in said containment container until a predetermined solidity of the product is reached, said predetermined solidity of the product occurring when a resisting torque applied to the screw member exceeds said elastic member force applied to said motor member, wherein said resisting torque is exerted on said screw member in a direction opposite a rotational direction of said screw member via said product, said microswitch sending a signal to said electronic control board when said resisting torque exceeds said elastic member force;

switching said cooling device on and off via said electronic control board when said resisting torque exceeds said elastic member force to maintain said predetermined solidity of said product;

measuring a temperature of said product inside said tank when said resisting torque exceeds said elastic member force and setting said temperature as a reference temperature;

controlling said temperature of said product inside said tank to preserve said reference temperature during subsequent working of said apparatus.

7. The method according to claim 6, wherein the elastic member comprises a spring.

8. The method according to claim 6, wherein the elastic member comprises a spring.

9. The method according to claim 6, wherein the elastic member force is adjustable via a fastener.

10. A method for preparing refrigerated products, the method comprising the steps of:

providing an apparatus comprising at least one containment tank for containing a product to be prepared, a mixing device arranged inside said tank and said mixing device configured provide a continuous circulation of said product inside said tank, a cooling device arranged inside said tank to cool said product, an electronic control board for controlling said cooling device, a motor member configured to rotate said mixing device when said motor member is actuated, an elastic member, a microswitch and a dispensing device of said product connected to said containment tank, said elastic member applying an elastic member force to said motor member, said mixing device comprising a screw member, said motor member being connected to the screw member for rotating the screw member;

in a preparation step, controlling a solidity of said product being prepared inside said tank such that said solidity of said product has a predetermined solidity, said predetermined solidity corresponding to a solidity of said product that applies a resisting torque to said screw member that is greater than said elastic member force;

upon reaching said predetermined solidity, measuring a temperature of said product inside said tank;

setting said temperature of said product upon reaching said predetermined solidity as a reference temperature;

in a preserving step, controlling said temperature of said product inside said tank to preserve said reference temperature during subsequent working of said apparatus;

automatically repeating, in case of temperature variation inside said tank beyond a prefixed limit, a cycle comprising said preparation step to bring said product at said predetermined solidity, a stabilization step of said predetermined solidity followed by measuring said reference temperature and a preserving step of said reference temperature through a constant control of said temperature of said product.

11. The method according to claim 10, wherein the elastic member comprises a spring.

12. The method according to claim 10, wherein the elastic member comprises a spring.

13. The method according to claim 10, wherein the elastic member force is adjustable via a fastener.

* * * * *